United States Patent
Matsui et al.

(10) Patent No.: US 8,073,919 B2
(45) Date of Patent: Dec. 6, 2011

(54) MOBILE TERMINAL, METHOD, AND COMPUTER PROGRAM FOR COMMUNICATING DATA WITH SERVERS WITH DATA COLLISION CONTROL

(75) Inventors: Kazuki Matsui, Kawasaki (JP); Hideto Kihara, Kawasaki (JP); Soichi Nishiyama, Kawasaki (JP); Yasuhiko Awamoto, Yokohama (JP); Hiroshi Kokubo, Yokohama (JP); Chizu Tuge, Yokohama (JP); Yoshiyuki Ito, Kawasaki (JP); Norie Tachibana, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 628 days.

(21) Appl. No.: 11/544,179

(22) Filed: Oct. 5, 2006

(65) Prior Publication Data
US 2007/0245008 A1    Oct. 18, 2007

(30) Foreign Application Priority Data
Apr. 14, 2006   (JP) ................................ 2006-111483

(51) Int. Cl.
*G06F 15/16* (2006.01)
*H04B 15/00* (2006.01)
(52) U.S. Cl. ........ 709/207; 709/235; 455/509; 455/512
(58) Field of Classification Search .................. 709/235, 709/207; 455/509, 511, 512
See application file for complete search history.

(56) References Cited

U.S. PATENT DOCUMENTS

| | | | |
|---|---|---|---|
| 5,630,184 A * | 5/1997 | Roper et al. ................. | 709/221 |
| 5,974,460 A | 10/1999 | Maddalozzo, Jr. et al. | |
| 6,728,265 B1 * | 4/2004 | Yavatkar et al. .............. | 370/468 |
| 2002/0136183 A1 * | 9/2002 | Chen et al. .................... | 370/338 |
| 2003/0179773 A1 | 9/2003 | Mocek et al. | |
| 2004/0142694 A1 * | 7/2004 | Levy et al. .................... | 455/450 |
| 2004/0172476 A1 | 9/2004 | Chapweske | |
| 2004/0246937 A1 * | 12/2004 | Duong et al. ................. | 370/345 |
| 2005/0141596 A1 * | 6/2005 | Black et al. ................... | 375/133 |
| 2005/0265282 A1 * | 12/2005 | Gross et al. .................. | 370/329 |

FOREIGN PATENT DOCUMENTS

| | | |
|---|---|---|
| JP | 2004-200857 | 7/2004 |
| WO | WO 00/77637 A1 | 12/2000 |
| WO | WO 2004/028087 A1 | 4/2004 |

* cited by examiner

*Primary Examiner* — Joseph Avellino
*Assistant Examiner* — Jeong S Park
(74) *Attorney, Agent, or Firm* — Greer, Burns & Crain, Ltd.

(57) ABSTRACT

A mobile terminal, data communication method, and a computer program stored in a computer-readable medium for communicating management data in a more efficient way. A management data communication interface communicates management data regularly with a management server, while an application data communication interface communicates application data with an application server on a demand basis. A data collision detector detects a collision between the management data and application data. If a collision is detected, a priority resolver determines whether to prioritize application data over management data. The management data suppressor suspends the management data communication interface when the priority resolver has determined that application data should be prioritized over management data.

9 Claims, 21 Drawing Sheets

72 PENDING TRANSMIT DATA MANAGEMENT TABLE

| PENDING MESSAGES | PENDING TRANSMIT DATA (byte) | TRANSMISSION WAIT TIME (min) |
|---|---|---|
| 3 | 510 | 31 |

FIG. 5

400 MANAGEMENT DATA

[HTTP HEADER]
POST http://localhost/m2es/servlet;jsessionid=F799B320CC0 HTTP/1.0
Content-Length: 78
User-Agent: DCM/2.0 D_INET_CLIENT(c100;TJ)
Host: localhost
Proxy-Connection: Keep-Alive
Pragma: no-cache
Cookie: JSESSIONID=7F180E420CC0

[HTTP BODY]
_lg=1134110843515,100,800,ICA011,1.0.0%0A···

FIG. 9

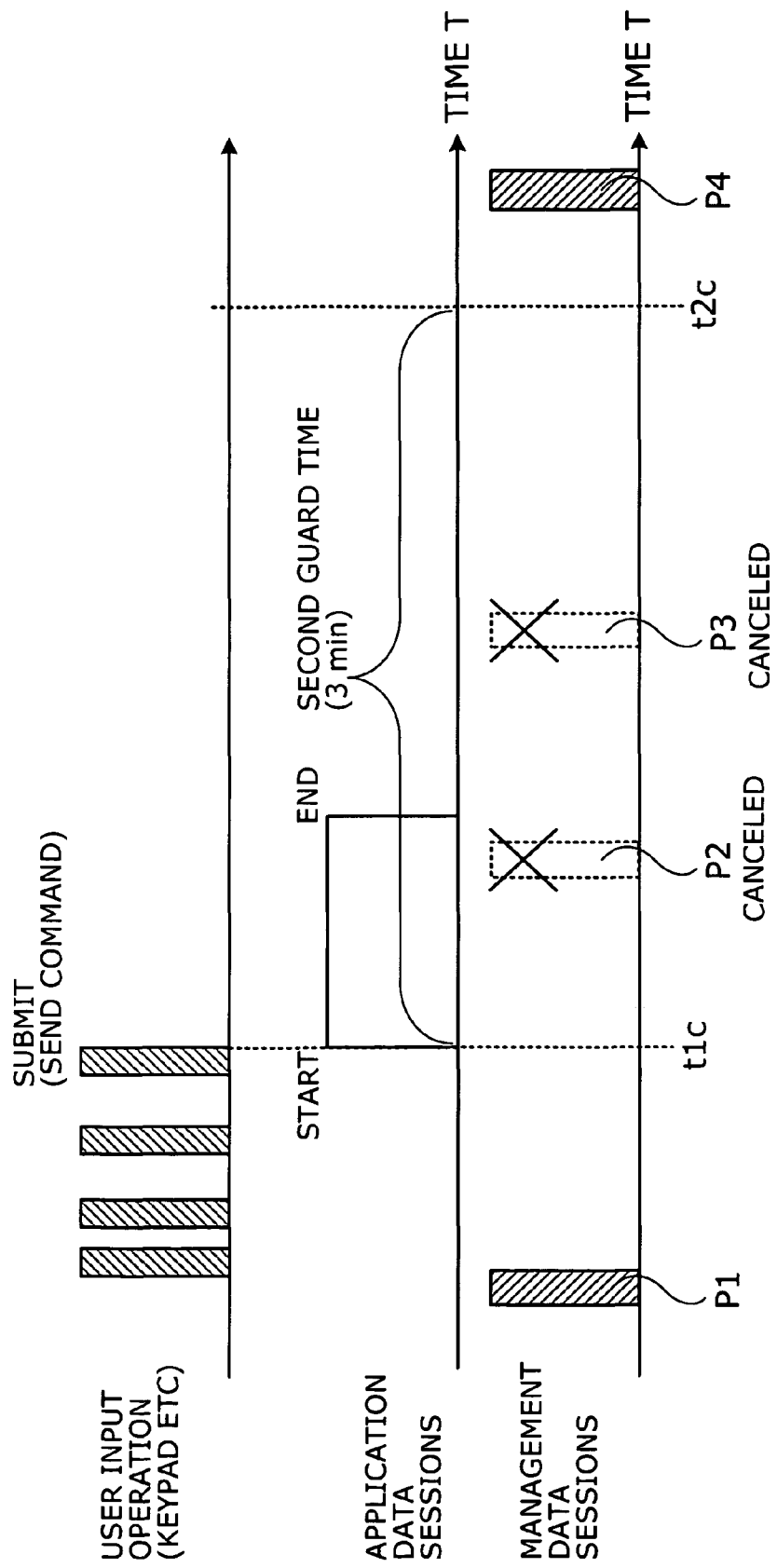

MOBILE TERMINAL, METHOD, AND COMPUTER PROGRAM FOR COMMUNICATING DATA WITH SERVERS WITH DATA COLLISION CONTROL

CROSS-REFERENCE TO RELATED APPLICATIONS

This application is based upon and claims the benefits of priority from the prior Japanese Patent Application No. 2006-111483, filed on Apr. 14, 2006, the entire contents of which are incorporated herein by reference.

BACKGROUND OF THE INVENTION

1. Field of the Invention

The present invention relates to a mobile terminal, a data communication method, and a data communication program stored in a computer-readable storage medium. More particularly, the present invention relates to a mobile terminal, a data communication method, and a computer program for communicating data with servers.

2. Description of the Related Art

Mobile communications systems are widely used in recent years, not only for personal communication, but also for business activities. The latter case requires remote maintenance capabilities and operation management functions in order to prepare for potential damages caused by the loss of mobile terminals used in business, and to reduce the cost for maintenance and operations of such terminals. For this purpose, mobile terminal devices are supposed to have the capability of sending and receiving data for management purposes, besides being able to exchange data of business applications. The former class of data is referred to herein as "management data," and the latter class of data is referred to herein as "application data." Specifically, the management data communication includes uploading of operation logs and receiving push services. This kind of data is exchanged by using polling techniques.

The radio communications technologies have enabled the deployment of cellular communications services, wireless local area networks (LAN), and, in Japan, Personal Handyphone Systems (PHS). Those mobile communication environments are, however, limited in their available communication bandwidths. Frequent exchange of management data would consume the available bandwidth excessively and thus choke the communication channels of application data, resulting in communication delays and errors. Some existing specifications for mobile applications only allow a terminal device to perform a single communication session at a time. Mobile terminals using such applications would be seriously affected by the excessive traffic of management data.

A known method for avoiding the above-described problem is to classify the transmit data with different priorities and schedule their communication sessions accordingly. Specifically, the method employs transmit queues to control the flow of data (see, for example, Japanese Unexamined Patent Application Publication No. 2004-200857).

The above queue-based method, however, requires implementation of a complicated control algorithm and thus increases the size of applications since application data and management data are separately controlled. Also the response of application data communication would be worse than what users expect normally, thus making it difficult for the users to do their jobs quickly. More specifically, the use of transmit queues increases the latency of transmit data, i.e., the time lag from depression of a send button to actual transmission of data. This is because the queue-based communication control process involves the multiple steps of entering transmit data into appropriate queues, comparing the priority of each piece of data with others, and selecting data with a high priority before sending it.

SUMMARY OF THE INVENTION

In view of the foregoing, it is an object of the present invention to provide a mobile terminal, data communication method, and a computer program stored in a computer-readable medium for communicating management data in a more efficient way.

To accomplish the above object, the present invention provides a computer-readable medium storing a program for use in a mobile terminal containing a computer to communicate data with servers. This program causes the computer to provide the following functional elements: a management data communication interface, an application data communication interface, a data collision detector, a priority resolver, and a management data suppressor. The management data communication interface communicates management data regularly with a management server, while the application data communication interface communicates application data with an application server on a demand basis. The data collision detector detects a collision between the management data and the application data, and the priority resolver determines whether to prioritize the application data over the management data, when a collision is detected. The management data suppressor suspends the management data communication interface when the application data should be prioritized over the management data.

Also, to accomplish the above object, the present invention provides a method for use in a mobile terminal containing a computer to communicate data with servers. This method comprises the following steps: (a) communicating management data regularly with a management server; (b) communicating application data with an application server on a demand basis; (c) detecting a collision between the management data and application data being communicated; (d) determining whether to prioritize the application data over the management data, when a collision is detected between the application data and management data; and (e) suspending a communication session of the management data when said determining step has determined that the application data should be prioritized over the management data.

Further, to accomplish the above object, the present invention provides a mobile terminal containing a computer to communicate data with servers. This mobile terminal is formed from the following elements: a management data communication interface, an application data communication interface, a data collision detector, a priority resolver, and a management data suppressor. The management data communication interface communicates management data regularly with a management server, while the application data communication interface communicates application data with an application server on a demand basis. The data collision detector detects a collision between the management data and the application data, and the priority resolver determines whether to prioritize the application data over the management data, when a collision is detected. The management data suppressor suspends the management data communication interface when the application data should be prioritized over the management data.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 shows an example data structure of a pending transmit data management table.

FIG. 9 shows an example of management data.

FIG. 21 shows an example of the scheduling process according to the third embodiment.

DESCRIPTION OF THE PREFERRED EMBODIMENTS

Figure 1:
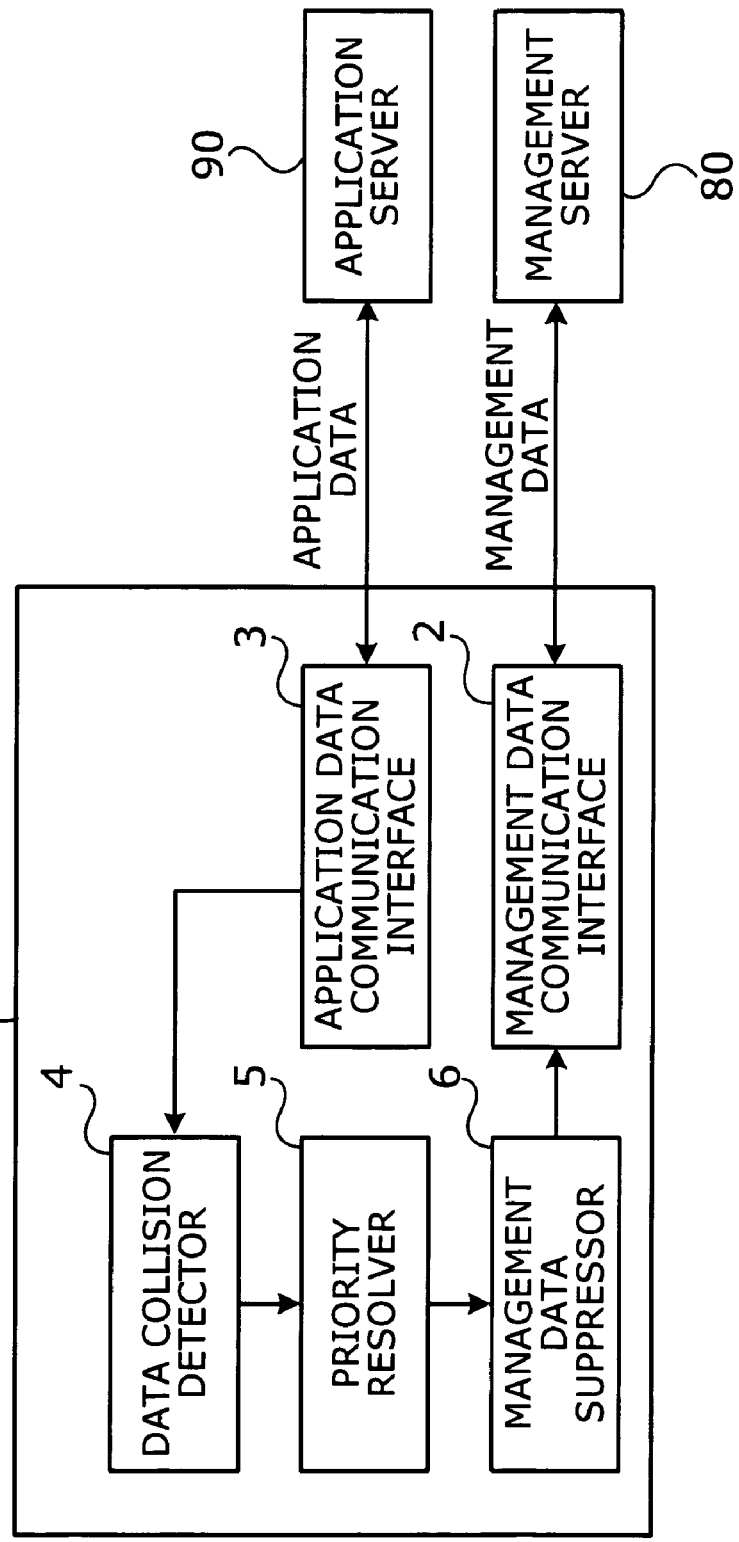
FIG. 1 gives an overview of a mobile terminal in which the present invention is embodied.

Preferred embodiments of the present invention will now be described in detail below with reference to the accompanying drawings, wherein like reference numerals refer to like elements throughout. The description begins with an overview of the present invention and then presents more specific embodiments of the invention.

FIG. 1 gives an overview of a mobile terminal in which the present invention is embodied. This mobile terminal 1 contains a computer that provides the following functions: a management data communication interface 2, an application data communication interface 3, a data collision detector 4, a priority resolver 5, and a management data suppressor 6.

The management data communication interface 2 communicates management data regularly with a management server 80. The term "management data" refers, for example, to an operation log that records what the user did with the mobile terminal 1. It may also refer to push content that the mobile terminal 1 receives and displays or stores without intervention of the user.

The application data communication interface 3 communicates application data with an application server 90 on a demand basis. The term "application data" refers, for example, to a business report that the user uploads to the application server 90. It may also refer to data that the user downloads from the application server 90 for business purposes.

The data collision detector 4 detects a collision between the management data and application data (more precisely, it detects a collision between communication sessions of management data and application data). The data collision detector 4 may use various methods to detect collisions, one of which is to monitor the delays and errors of application data being transmitted. The present invention, however, is not limited to this specific implementation.

The priority resolver 5 determines whether to prioritize the application data over the management data, when the data collision detector 4 has detected a collision between them.

The management data suppressor 6 suspends the management data communication interface 2 when the priority resolver 5 has determined that the application data should be prioritized over the management data. The management data suppressor 6 re-enables the management data communication interface 2 later to restart communication sessions for the pending management data. This restart takes places immediately after the present communication session of application data is finished. Or alternatively, it takes place when a prescribed condition is satisfied after the present communication session of application data is finished.

In operation, the management data communication interface 2 and management server 80 exchange management data at regular intervals, while the application data communication interface 3 and application server 90 exchange application data when necessary. The data collision detector 4 monitors traffic of management data and application data to determine whether there is a collision between them. If a collision is detected, then the priority resolver 5 determines whether to prioritize application data communication over management data communication. If the priority resolver 5 determines that the application data has a higher priority, the management data suppressor 6 suspends the management data communication interface 2 to stop communication sessions of management data.

Data Communications System

Figure 2:
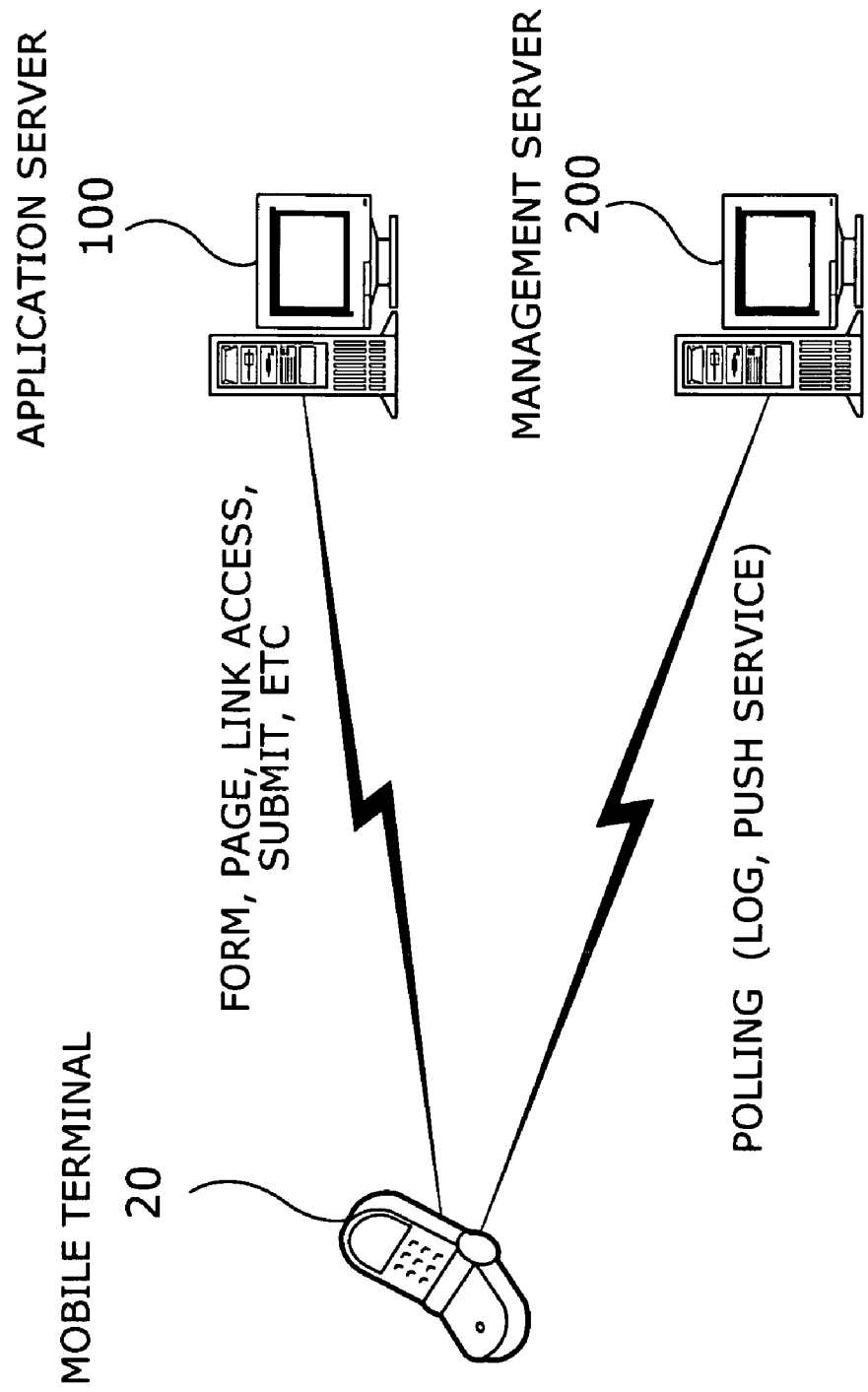
FIG. 2 is a block diagram showing a data communications system according to an embodiment of the present invention.

FIG. 2 is a block diagram showing a data communications system according to an embodiment of the present invention. The illustrated data communications system involves a mobile terminal 20 connected with an application server 100 and a management server 200 via a communications network (not shown). The application server 100 manages business applications, transmitting and receiving application data (data related to business activities) to/from the mobile terminal 20. For example, the application server 100 sends a form or page to the mobile terminal 20 for display on its monitor screen, receives various requests (e.g., an access to a linked page) from the mobile terminal 20, and returns a response to the mobile terminal 20. The management server 200 also receives business reports from the mobile terminal 20 and stores them in its local storage.

The management server 200 manages the mobile terminal 20, providing various services on its request. Specifically, the management server 200 polls the mobile terminal 20 to determine whether it has a request for data transmission or data processing (e.g., transmitting a log and receiving push content).

The mobile terminal 20 can communicate with other mobile terminals via a mail server, telephone communications network, and other network infrastructures (all not shown), besides sending and receiving various data to/from the application server 100 and management server 200. This mobile terminal 20 may be a cellular phone, a PHS terminal, or a personal digital assistant (PDA) device. The present invention is, however, not limited to those types of terminals.

Mobile Terminal

Figure 3:
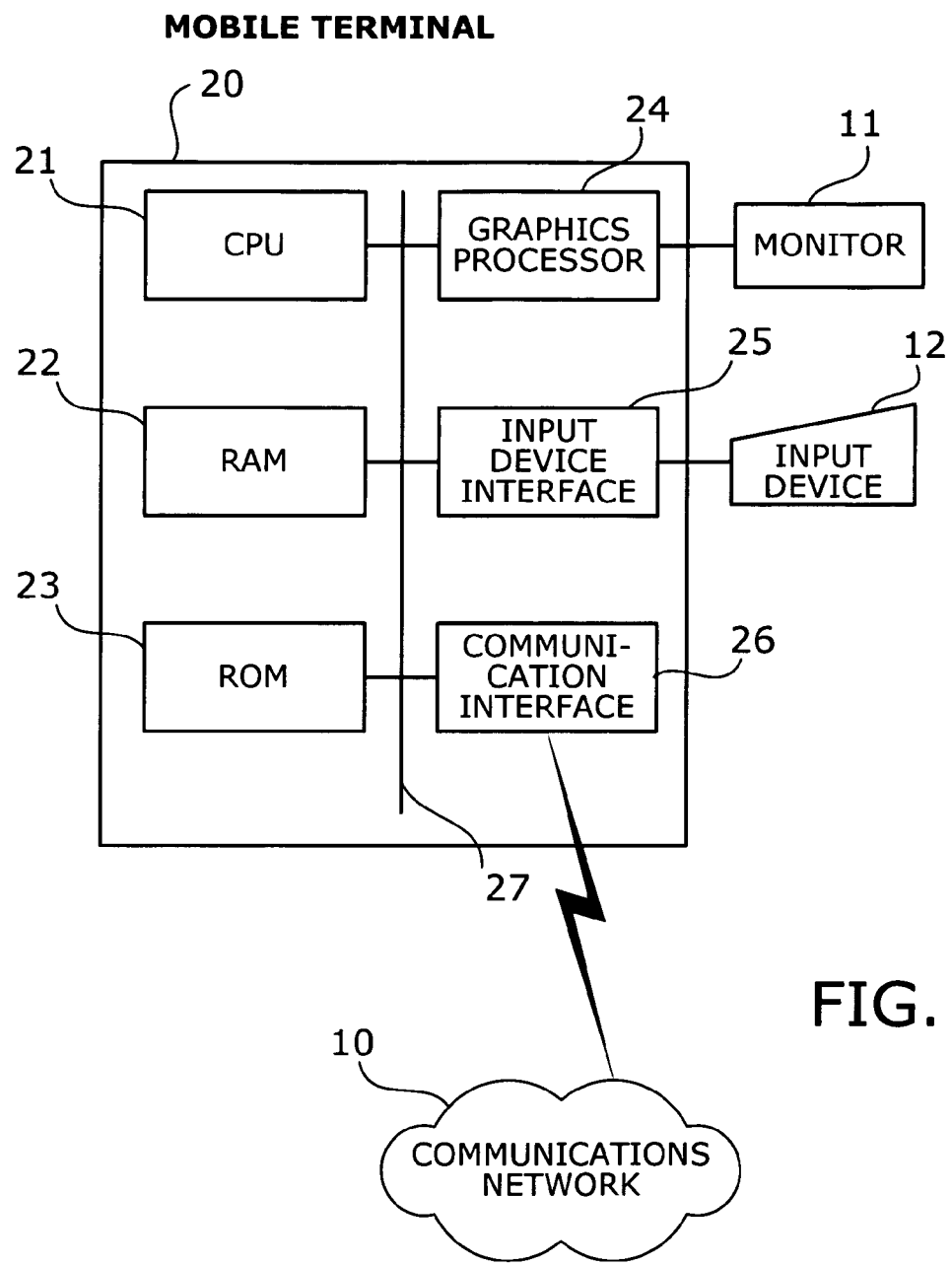
FIG. 3 shows an example hardware configuration of a mobile terminal.

FIG. 3 shows an example hardware configuration of a mobile terminal. This mobile terminal 20 has the following functional elements: a central processing unit (CPU) 21, a random access memory (RAM) 22, read-only memory (ROM) 23, a graphics processor 24, an input device interface 25, and a communication interface 26. The CPU 21 controls the entire device, interacting with other elements via a bus 27.

The RAM 22 serves as temporary storage for the whole or part of operating system (OS) programs and application programs that the CPU 21 executes, in addition to other various data objects manipulated at runtime. The ROM 23 stores OS program files and application program files.

The graphics processor 24 produces video images in accordance with drawing commands from the CPU 21 and outputs them on the screen of a monitor 11 coupled thereto. The input device interface 25 is used to receive signals from an input device 12 having a plurality of key pads including numeric keys. Those input signals are delivered to the CPU 21 via the bus 27. The communication interface 26 is connected to a communications network 10, allowing the CPU 21 to exchange data with the application server 100 and management server 200, as well as with peer mobile terminals (not shown).

The processing functions of the present embodiment are implemented on the above-described hardware platform. The illustrated hardware structure of FIG. 3 can also be applied to the application server 100 and management server 200, in which case hard disk drives (HDD) and other components will be added, and a keyboard and a mouse will be attached as input devices 12.

Figure 4:
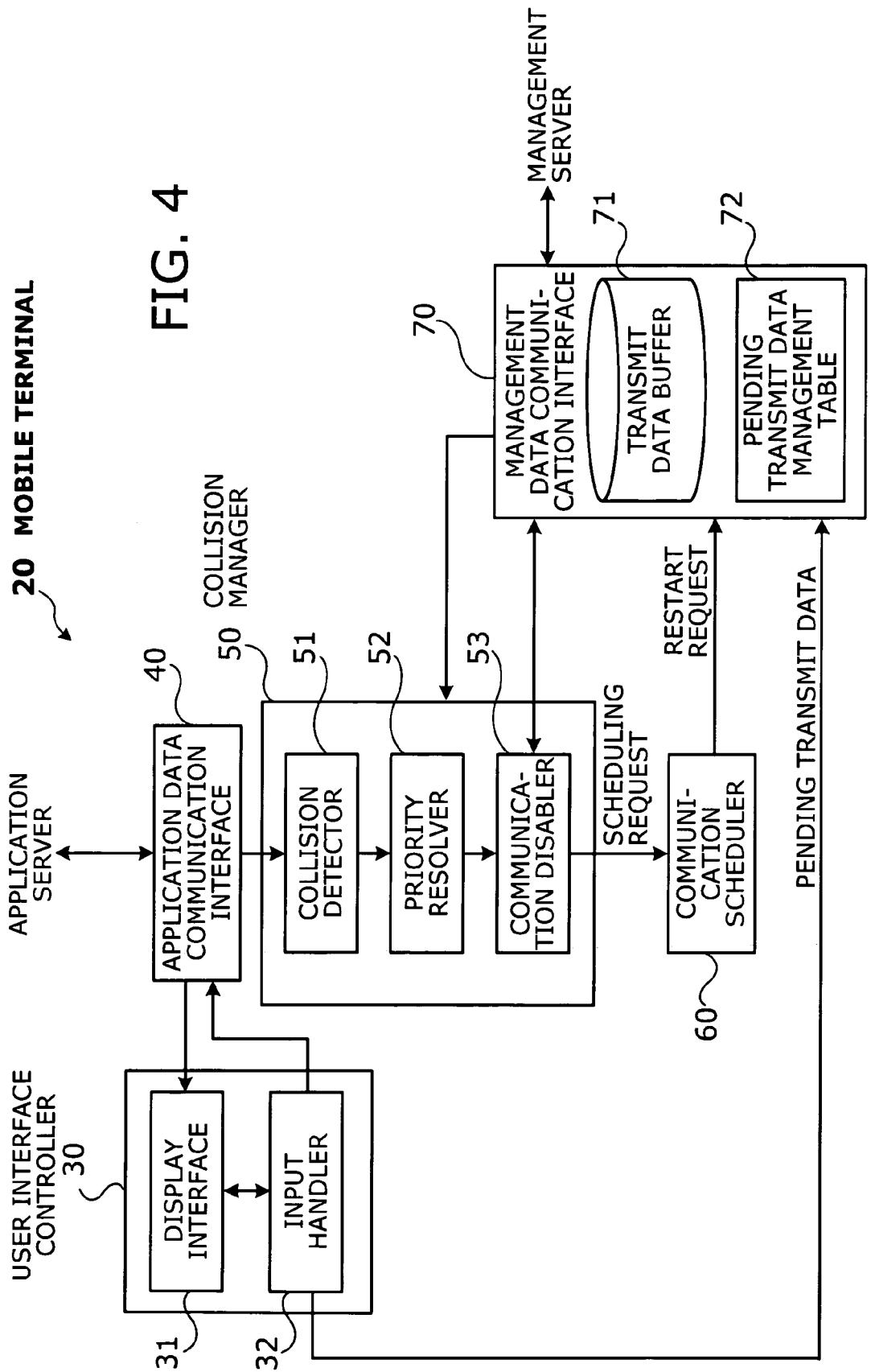
FIG. 4 is a functional block diagram of a mobile terminal according to a first embodiment of the invention.

FIG. 4 is a block diagram of the mobile terminal 20 based on the hardware platform of FIG. 3. To implement the feature of data communication, the mobile terminal 20 has the following functional elements: a user interface controller 30, an application data communication interface 40, a collision manager 50, a communication scheduler 60, and a management data communication interface 70.

The user interface controller 30 has a display interface 31 and an input handler 32 to provide a graphical user interface. The display interface 31 displays various on-screen objects and pages on the monitor 11 according to the user's operation of the input device 12. Suppose, for example, that the user enters a command for calling up a mobile application page (described later) in an attempt to send a report related to his/her business. This operation on the input device 12 causes the display interface 31 to display a mobile application page on the monitor screen by loading a set of page definition data (described later) corresponding to the command.

The input handler 32 executes a process corresponding to a user input received through the input device 12. For example, the input handler 32 sends a log of the user's key operation to the management data communication interface 70 as management data to be transmitted. The user may operate the input device 12 when a particular mobile application page is displayed on the monitor screen. If this happens, the input handler 32 parses what the user has entered and produces a piece of application data representing the user's intent. This application data is then passed to the application data communication interface 40.

The application data communication interface 40 communicates with the application server 100 on a demand basis, sending and receiving various data including page definitions. Specifically, the application data communication interface 40 sends application data to the application server 100 when it is received from the input handler 32. The application data communication interface 40 provides page definition data to the display interface 31 when it is received from the application server 100.

The collision manager 50 is formed from a collision detector 51, a priority resolver 52, and a communication disabler 53. The collision detector 51 determines whether there is a collision of communication signals representing application data and management data when they are transmitted. If a collision is detected, the collision manager 50 so notifies the priority resolver 52.

The priority resolver 52 receives a collision notice from the collision detector 51 through normal inter-thread communication facilities or other frameworks for event notification such as callback. The priority resolver 52 then determines which of the application data and management data should be delivered in the first place. If it determines that application data should be prioritized over management data, the priority resolver 52 sends a management data communication stop request to the communication disabler 53. To make this decision, the priority resolver 52 consults a pending transmit data management table 72 (described later) in the management data communication interface 70.

Upon receipt of a management data communication stop request, the communication disabler 53 stops the management data communication interface 70 from executing management data sessions. More specifically, the communication disabler 53 interacts with the management data communication interface 70 to obtain a management data communication object (memory object). This enables the communication disabler 53 to determine whether the management data communication interface 70 is in process of communicating management data. If so, the communication disabler 53 commands the management data communication object to stop its operation, thereby suspending the management data communication interface 70. The communication disabler 53 then further issues a scheduling request (i.e., a request for time management) to the communication scheduler 60.

Upon receipt of a scheduling request from the communication disabler 53, the communication scheduler 60 waits for a specified period of time. This wait time is determined from some conditions specified previously. More specifically, the communication scheduler 60 stops communication sessions for management data (hereafter, "management data sessions") immediately and waits for a predetermined time (e.g., ten seconds). Or alternatively, it may wait until the communication session of application data (hereafter, "application data session") is completed. The present invention, however, should not be limited to those examples. Upon expiration of the predetermined wait time, the communication scheduler 60 sends a management data communication restart request to the management data communication interface 70, thus permitting the suspended management data sessions to resume.

The management data communication interface 70 has a transmit data buffer 71 and a pending transmit data management table 72. The management data communication interface 70 communicates with the management server 200 at regular intervals by using a polling technique, which is referred hereafter to as "periodic polling." During this periodic polling process, the management data communication interface 70 transmits pending data to the management server 200, taking it out of the transmit data buffer 71. The interval of polling operation may be set to, for example, one minute, although the present invention is not limited to this specific interval. The management data communication interface 70 receives such pending transmit data from the input handler 32 and enters it in the transmit data buffer 71 before it is transmitted. Some other information related to the pending transmit data is stored in the pending transmit data management table 72. This additional information includes priority levels or conditions specifying in what cases application data has to be prioritized over management data.

The management data communication interface 70 stops management data sessions when the management data communication object is so instructed. Afterwards, communication scheduler 60 issues a management data communication restart request, which allows the management data communication interface 70 to restart management data sessions.

Pending Transmit Data Management Table

FIG. 5 shows an example data structure of a pending transmit data management table. This pending transmit data management table 72 has the following data fields: "Pending Messages," "Pending Transmit Data (byte)," and "Transmission Wait Time (min)." Each row of the table forms an associated set of parameters.

The pending messages field shows the number of messages waiting for transmission, and the pending transmit data field indicates the amount of data that will be carried by those pending messages. The transmission wait time field gives the time elapsed since the last transmission of management data.

As mentioned earlier, the priority resolver 52 determines the priority of transmit data with reference to the pending transmit data management table 72 in the management data communication interface 70. The decision of priority is based on one of, or a combination of, the following conditions: (1) the amount of pending transmit data exceeds a predetermined threshold, (2) the number of pending messages exceeds a predetermined threshold, and (3) the transmission wait time exceeds a predetermined threshold. If the situation satisfies selected condition(s), then the priority resolver 52 determines that management data sessions are more urgent than application data sessions. The priority resolver 52 thus gives a higher priority to the waiting management data, thereby preventing the mobile terminal 20 from accumulating too much management data to be transmitted. The administrator responsible for managing application servers can specify what criteria the priority resolver 52 is supposed to use in determining the priority. Another situation where management data has to be prioritized is when the mobile terminal 20 sends the management server 200 a command related to communication control such as acknowledgment (ACK) of reception.

The management data communication interface 70 may be designed to reduce the interval of management data sessions or increase the amount of management data that can be transmitted at a time, when the above-described criteria are satisfied. By changing those parameters, the management data communication interface 70 effectively reduces the amount of pending data.

Mobile Application Page

Figure 6:
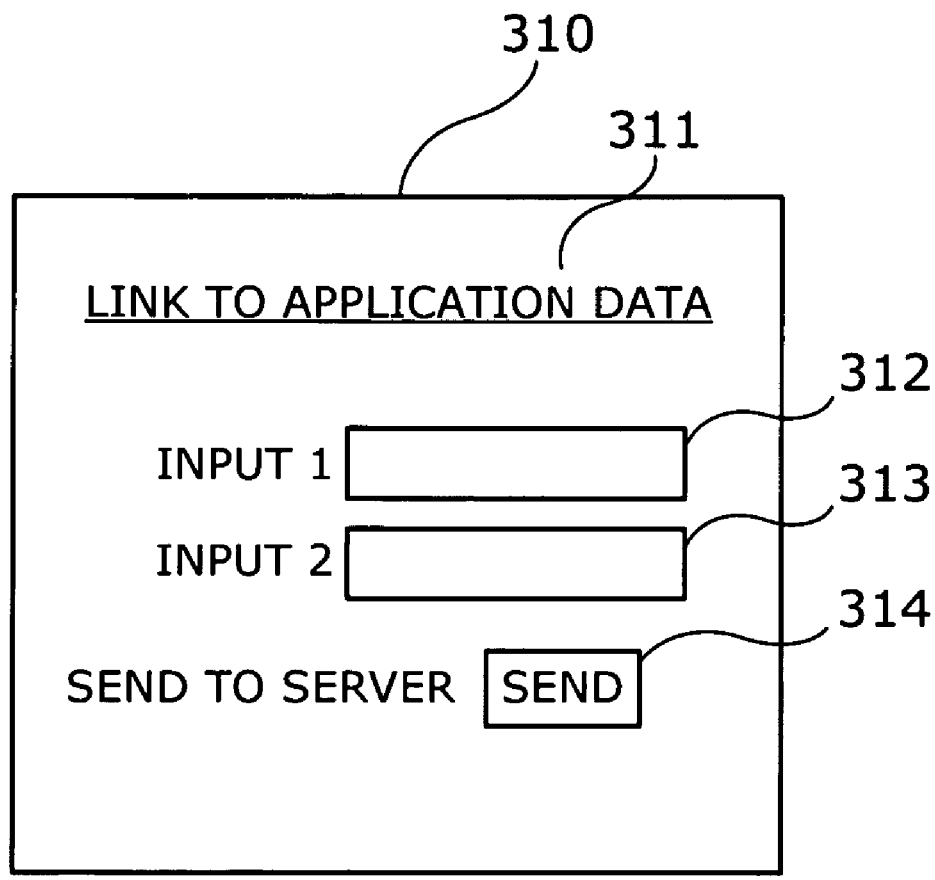
FIG. 6 shows a mobile application page on a display screen.

FIG. 6 shows a mobile application page on a display screen. This mobile application page 310 contains a link 311, text input boxes 312 and 313, and a SEND button 314. A hyperlink pointing to a piece of application data is embedded at a part or whole of the text in a document page. In the case of FIG. 6, the link 311 is placed across the entire line. When the user selects the link 311 by operating the input device 12, the input handler 32 produces application data that causes the application data communication interface 40 to make access to a corresponding data object in the application server 100.

The text input boxes 312 and 313 are used to enter character strings and symbols for business applications. The user presses the SEND button 314 to send what he/she has entered in either or both of those text input boxes 312 and 313 to the application server 100. The depression of the SEND button 314 causes the input handler 32 to pass the entered information to the application data communication interface 40.

Figure 7:
FIG. 7 shows page definition data defining the mobile application page.

FIG. 7 shows page definition data defining the mobile application page 310. This page definition data 500 is written with the hypertext markup language (HTML). Specifically, the page definition data 500 includes a link to a data object stored in the application server 100, the location of which is defined as an HREF property. Also included in the page definition data 500 is a submit command used to initiate data transmission to the application server 100. The page definition data 500 has previously been downloaded from the application server 100 and stored in a local storage device of the mobile terminal 20.

Application Data and Management Data

Figure 8:
FIG. 8 shows an example of application data.

FIG. 8 shows an example of application data. The illustrated application data 300 is formed from two parts: hypertext transfer protocol (HTTP) header and HTTP body. The HTTP header contains the following elements: destination URL, content length, user agent (used to identify the model of a mobile terminal), host name, proxy connection (describing how the application server 100 is connected), Pragma, and Cookie. The HTTP body represents what the user entered in the text input boxes 312 and 313.

FIG. 9 shows an example of management data. The management data 400 is formed from HTTP header and HTTP body. The HTTP header of application data includes a destination URL and other elements similar to that of the application data 300. The HTTP body, on the other hand, contains an operation log and other information about the mobile terminal 20.

Application Data Communication

Figure 10:
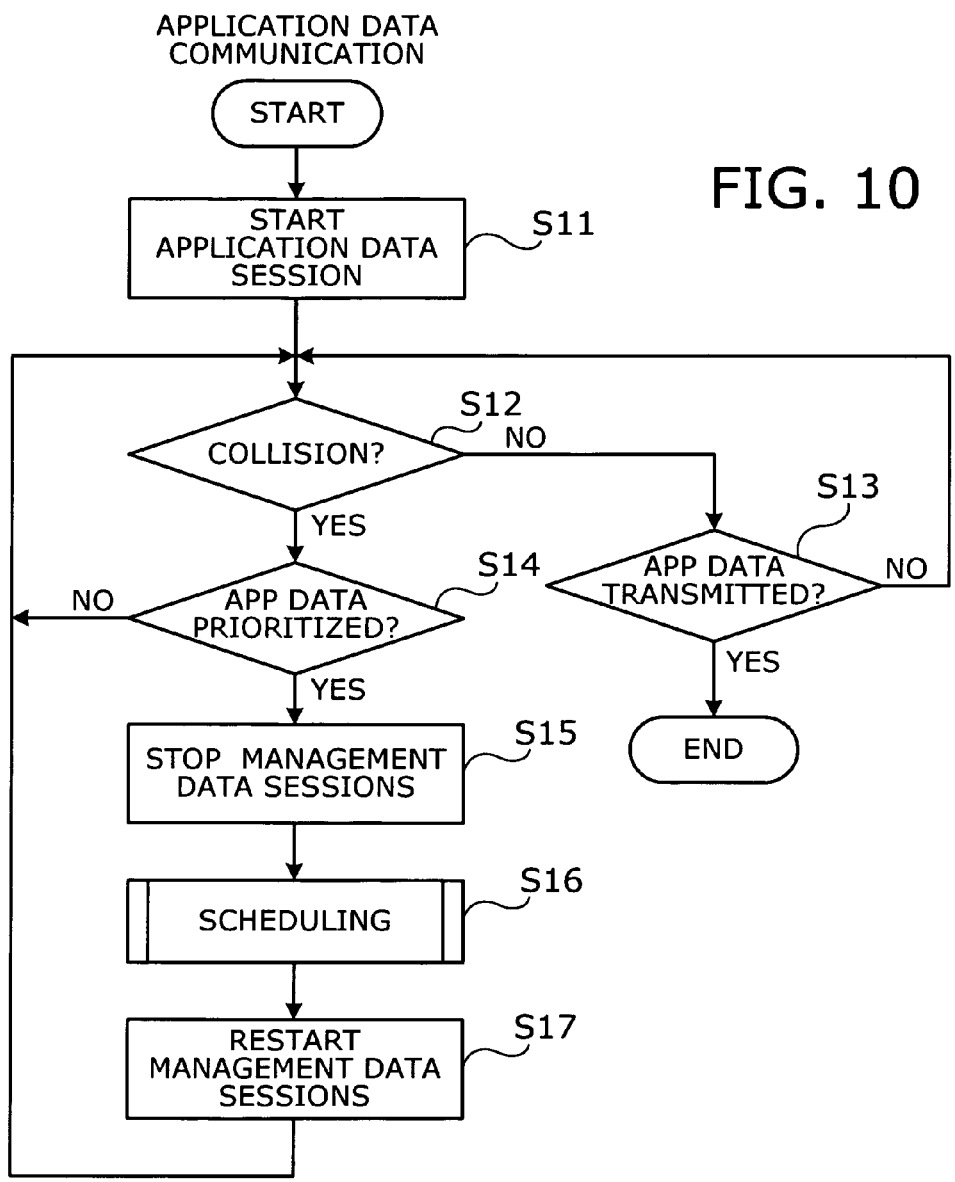
FIG. 10 is a flowchart showing application data communication according to a first embodiment of the present invention.

FIG. 10 is a flowchart showing how the mobile terminal 20 communicates application data according to a first embodiment of the present invention. The application data communication interface 40 starts transmitting application data when it is received (step S11). The collision detector 51 determines whether there is a collision (step S12). If no collisions are observed (if "NO" at step S12), then the application data communication interface 40 determines whether the application data is transmitted (step S13). If the application data is transmitted (if "YES" at step S13), the application data communication interface 40 terminates the present process. If not (if "NO" at step S13), the application data communication interface 40 returns to step S12 to repeat the above steps.

If a collision is detected at step S12 (if "YES" at step S12), the priority resolver 52 determines the priority of application data sessions and management data sessions. More specifically, the priority resolver 52 determines whether to prioritize application data communication over management data (step S14). If application data communication is lower in priority than management data (if "NO" at step S14), the present process returns to step S12 to continue the current application data session. If application data is higher in priority (if "YES" at step S14), the priority resolver 52 issues a management data communication stop request to the communication disabler 53. Upon receipt of this request, the communication disabler 53 suspends the management data communication interface 70, thus stopping management data sessions (step S15). It also issues a scheduling request to the communication scheduler 60. This scheduling request causes the communication scheduler 60 to perform a scheduling task (described later), which generates a management data communication restart request so as to re-enable the management data communication interface 70 after a while (step S16). The management data communication interface 70 now resumes transmission of management data (step S17) and returns to step S12 to continue its operation.

Collision Detection

Figure 11:
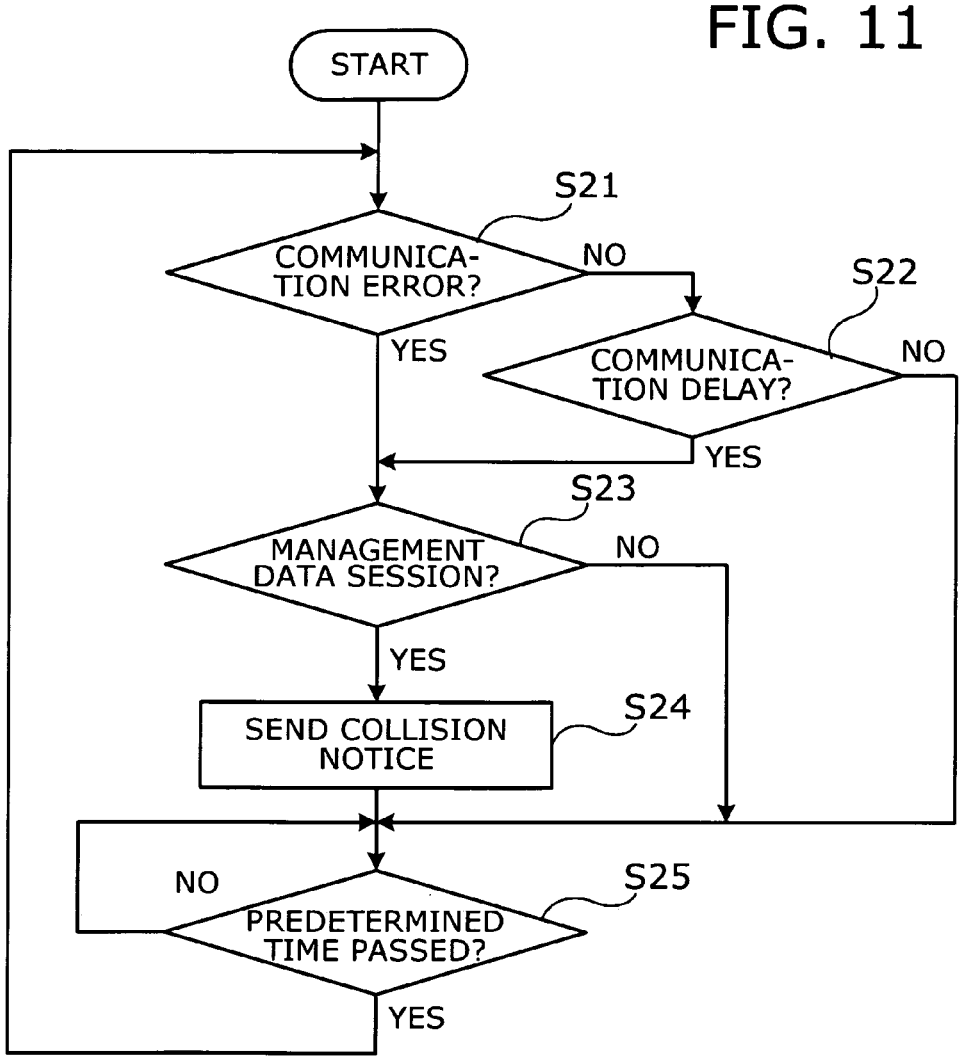
FIG. 11 is a flowchart showing how a collision detector determines the presence of collision.

FIG. 11 is a flowchart showing how the collision detector 51 detects a collision at step S12 of FIG. 10. The collision detector 51 first checks the result of each application data session to find a communication error (step S21). More specifically, it determines whether the transmission of application data has been finished successfully within a predetermined time. If not, the collision detector 51 identifies it as a communication timeout error. If no communication error is found (if "NO" at step S21), the collision detector 51 then checks whether the communication is delayed (step S22). If there is no delay (if "NO" at step S22), the collision detector 51 skips to step S25. If there is a communication delay (if "YES" at step S22), the collision detector 51 proceeds to step S23.

If a communication error is found at step S21 (if "YES" at step S21), then the collision detector 51 determines whether the management data communication interface 70 is in process of communicating management data (step S23). If there is no on-going management data session (if "NO" at step S23), the collision detector 51 moves to step S25. If, on the other hand, the management data communication interface 70 is in process of communicating management data (if "YES" at step S23), the collision detector 51 informs the priority resolver 52 of occurrence of a collision (step S24).

The collision detector 51 then waits for a predetermined time (step S25) while repetitively checking the elapsed time ("NO" at step S25). If the predetermined time has passed (if "YES" at step S25), the collision detector 51 returns to step S21 to continue the above processing.

Priority Resolver

Figure 12:
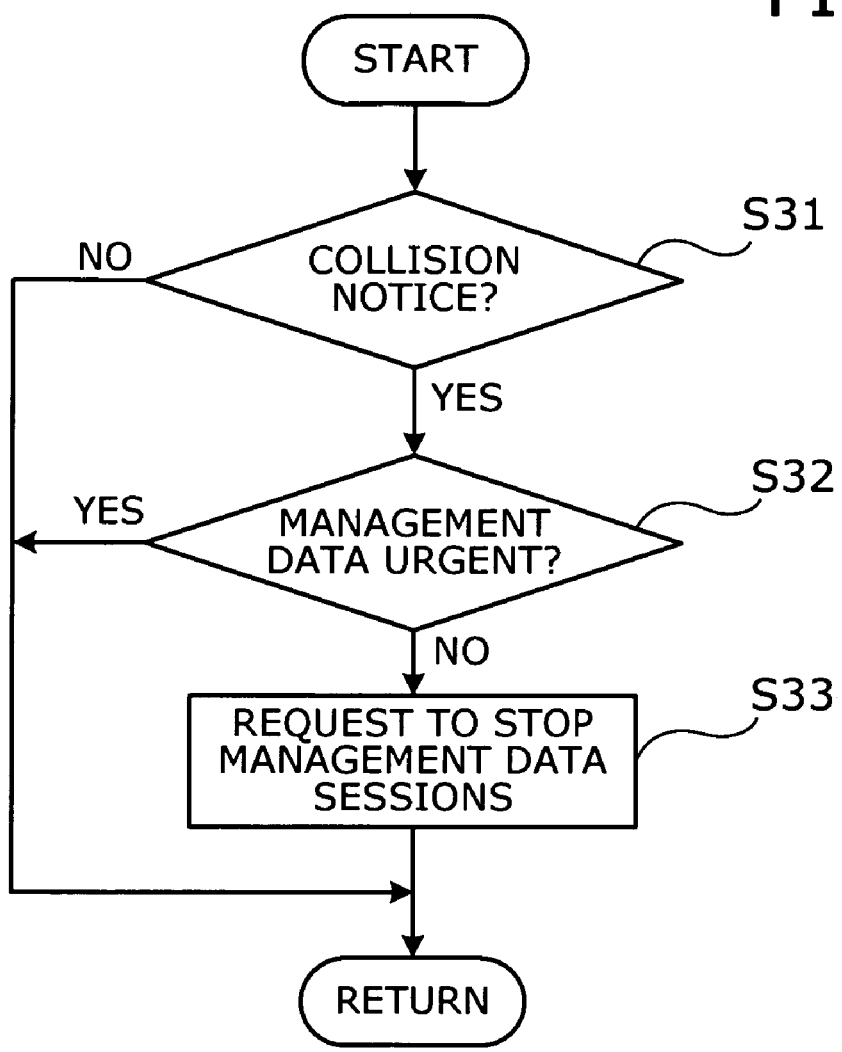
FIG. 12 is a flowchart showing how a priority resolver operates.

FIG. 12 is a flowchart showing how the priority resolver 52 operates at step S14 of FIG. 10. The priority resolver 52 first checks the presence of a collision notice (step S31). If there is no collision notice (if "NO" at step S31), the priority resolver 52 exits from the present process. If there is a collision notice (if "YES" at step S31), then the priority resolver 52 consults the pending transmit data management table 72 to determine whether the management data is of high urgency (step S32).

If management data sessions are found urgent (if "YES" at step S32), the priority resolver 52 exits from the process, giving a higher priority to management data sessions. In this case, the mobile terminal 20 may notify the user of its decision by commanding the display interface 31 to show a message stating that the management data communication is prioritized.

If, on the other hand, the management data sessions are found less urgent (if "NO" at step S32), the priority resolver 52 sends a management data communication stop request to the communication disabler 53 (step S33), thus concluding the priority resolution process.

Communication Scheduler

Figure 13:
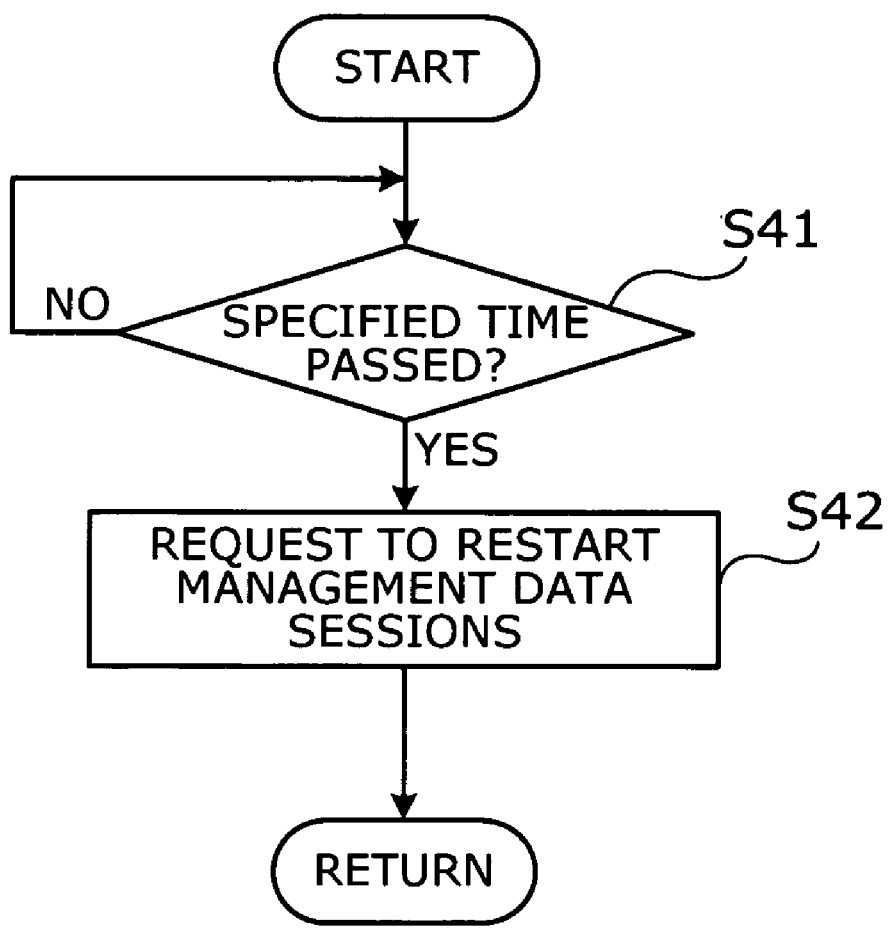
FIG. 13 is a flowchart of a scheduling process performed by a communication scheduler.

FIG. 13 is a flowchart of the scheduling process that the communication scheduler 60 executes at step S16 of FIG. 10. Upon receipt of a scheduling request, the communication scheduler 60 waits for a specified time (step S41) while repetitively checking the elapsed time (if "NO" at step S41). If the predetermined time has passed (if "YES" at step S41), the communication scheduler 60 sends a management data communication restart request to the management data communication unit 70 (step S42), thus concluding the scheduling process.

The scheduling process of the first embodiment will now be described more specifically with reference to FIG. 14, where the hatched boxes indicate periodic polling for transmission of management data.

Figure 14:
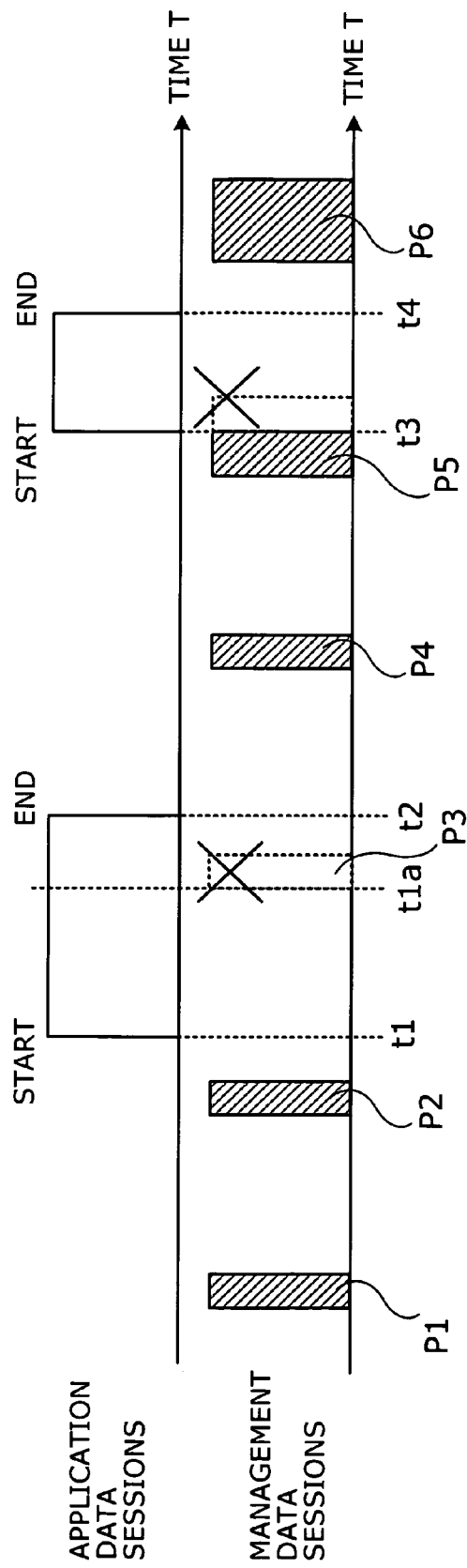
FIG. 14 shows an example of the scheduling process according to the first embodiment.

Referring to FIG. 14, the management data communication interface 70 begins transmitting application data at time point t1 after finishing two management data sessions P1 and P2. This transmission is completed at time point t2, with a collision detected at time point t1a. The priority resolver 52 then determines the priority, and if application data is supposed to be prioritized over management data, the priority resolver 52 cancels the polling of management data P3 during the period between t1a and t2. Then another application data session begins at time point t3 and lasts until time point t4. While a preceding management data session P5 is underway at that time, the priority resolver 52 cancels it part way because the new application data session at t3 is prioritized. In this case, the canceled management data session P5 is executed afterwards as another management data session P6.

As can be seen from the above explanation, the data communications system of the first embodiment has a collision detector 51 to detect a collision between application data and management data. When a collision is found, a priority resolver 52 determines which data should be prioritized. In the case where management data is lower in priority, a communication disabler 53 cancels periodic polling of management data, thus prioritizing application data. While a collision may cause delays or errors in communication sessions, the elevated priority of application data avoids those negative factors which would worsen the response of application data sessions, thus maintaining the efficiency of the data communications system.

The priority resolver 52 may not always prioritize application data over management data. Rather, it may give priority to management data as necessary, thus ensuring timely delivery of important data to the management server. The management server can therefore perform its management tasks without problem.

Compared to conventional methods, the present embodiment circumvents the complexity of controlling input queues and output queues, thus alleviating the load of communication control tasks. This feature, while applicable to both fixed and mobile terminals, is particularly advantageous for design of portable communication devices because it can fit well in the limited application sizes of those devices.

The present embodiment may be modified such that the mobile terminal 20 will monitor the condition of its radio wave signals and restrict management data sessions for a while if the signal level is low. A reduction in signal level could lead to a slowdown of communication and consequently to a longer transmission time and an increased probability of collision. The above modification avoids those potential problems, thus ensuring prompt delivery of application data.

Second Embodiment

Figure 15:
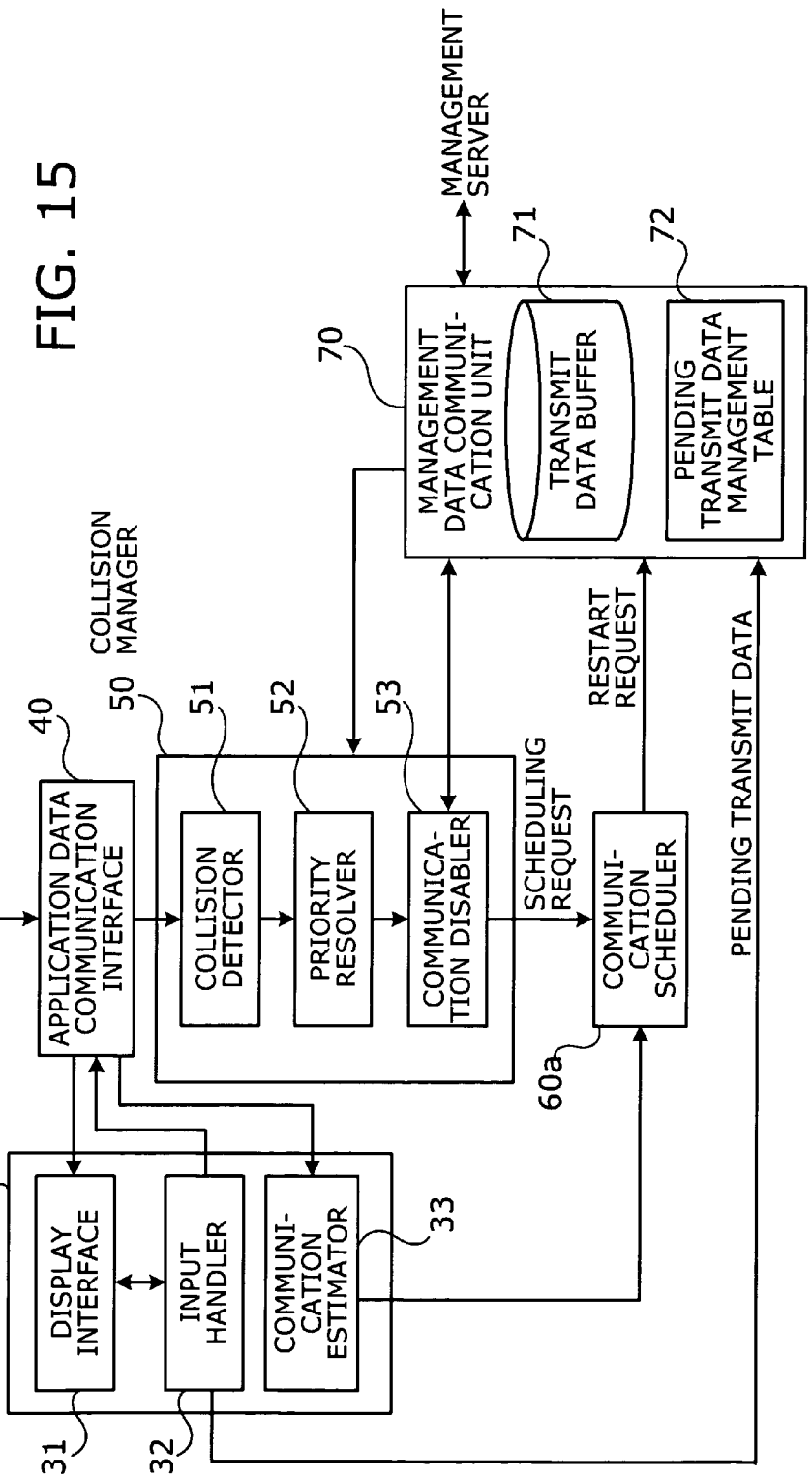
FIG. 15 is a block diagram of a data communications system according to a second embodiment of the present invention.

FIG. 15 is a block diagram of a data communications system according to a second embodiment of the present invention. Since many elements of the second embodiment are common to the first embodiment described in earlier sections, the following description of the second embodiment will focus on its distinct features, while not repeating explanation for the same elements. Specifically, the second embodiment differs from the first embodiment primarily in that the mobile terminal 20a has a communication estimator 33 as a new element of its user interface controller 30a. Another difference is that the mobile terminal 20a has a communication scheduler 60a with some modified functions.

The communication estimator 33 watches the application data communication interface 40 communicating application data. When an application data session is finished, the communication estimator 33 waits for a predetermined time (hereafter, "first guard time") before giving communication permission to the communication scheduler 60a. This first guard time is determined previously by, for example, the administrator responsible for management of the application server 100 and set to the communication estimator 33.

Unlike its counterpart in the first embodiment, the communication scheduler 60a does not allow the management data communication interface 70 to resume its operation immediately even if the specified time (recall step S41 of FIG. 13) has elapsed, but waits for permission from the communication estimator 33. It is not until permission is received that the communication scheduler 60a issues a management data communication restart request to the management data communication interface 70.

Figure 16:
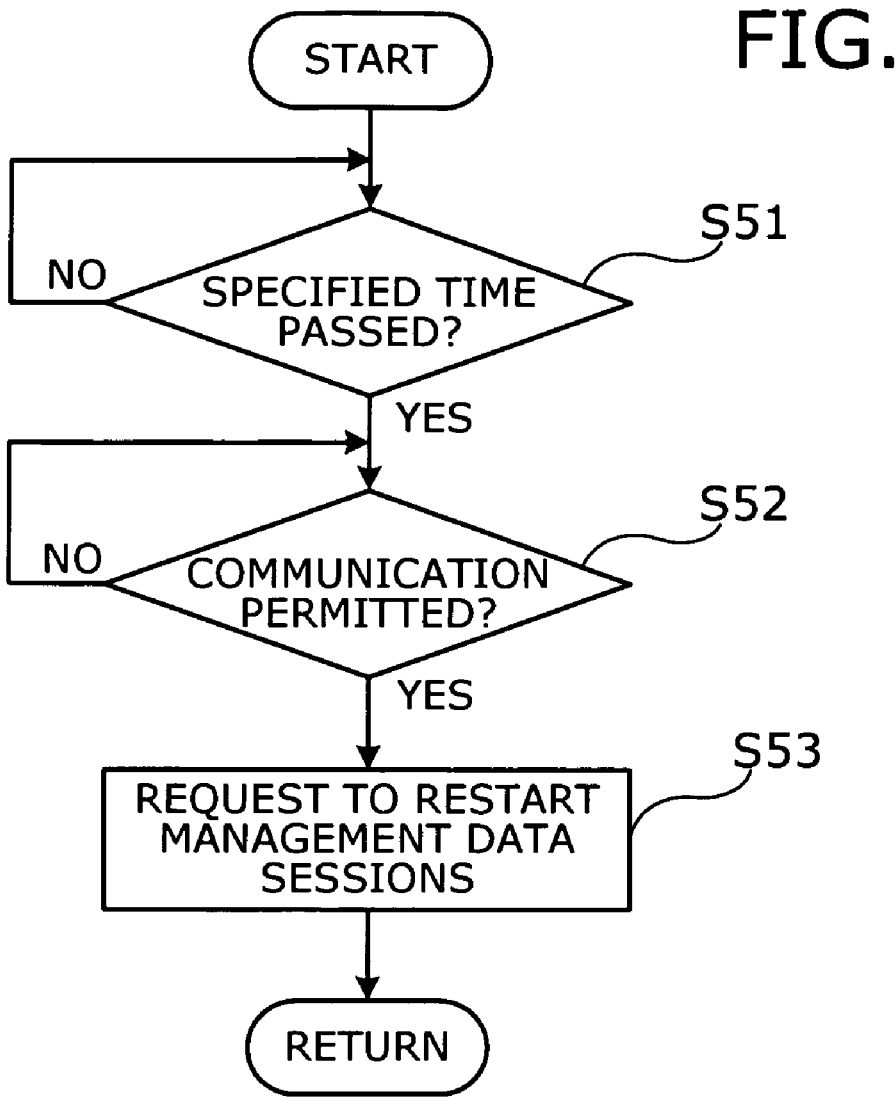
FIG. 16 is a flowchart showing a scheduling process according to the second embodiment.

Application data sessions in the second embodiment are only different from those in the first embodiment in its process of scheduling communication sessions. Other operations in the mobile terminal 20a is similar to the first embodiment. FIG. 16 is a flowchart showing a scheduling process according to the second embodiment, which proceeds as follows:

Upon receipt of a scheduling request, the communication scheduler 60a waits for a specified time (step S51) while repetitively checking the elapsed time (if "NO" at step S51). If the specified time has passed (if "YES" at step S51), the communication scheduler 60a determines whether communication permission is received from the communication estimator 33 (step S52). If there is no permission received (if "NO" at step S52), the communication scheduler 60a waits for it. When permission is received (if "YES" at step S52), the communication scheduler 60a issues a management data communication restart request to the management data communication interface 70 (step S53).

A specific example of scheduling operation in the second embodiment will be described with focus on its difference from the first embodiment and without repeating explanation for their common part.

Figure 17:
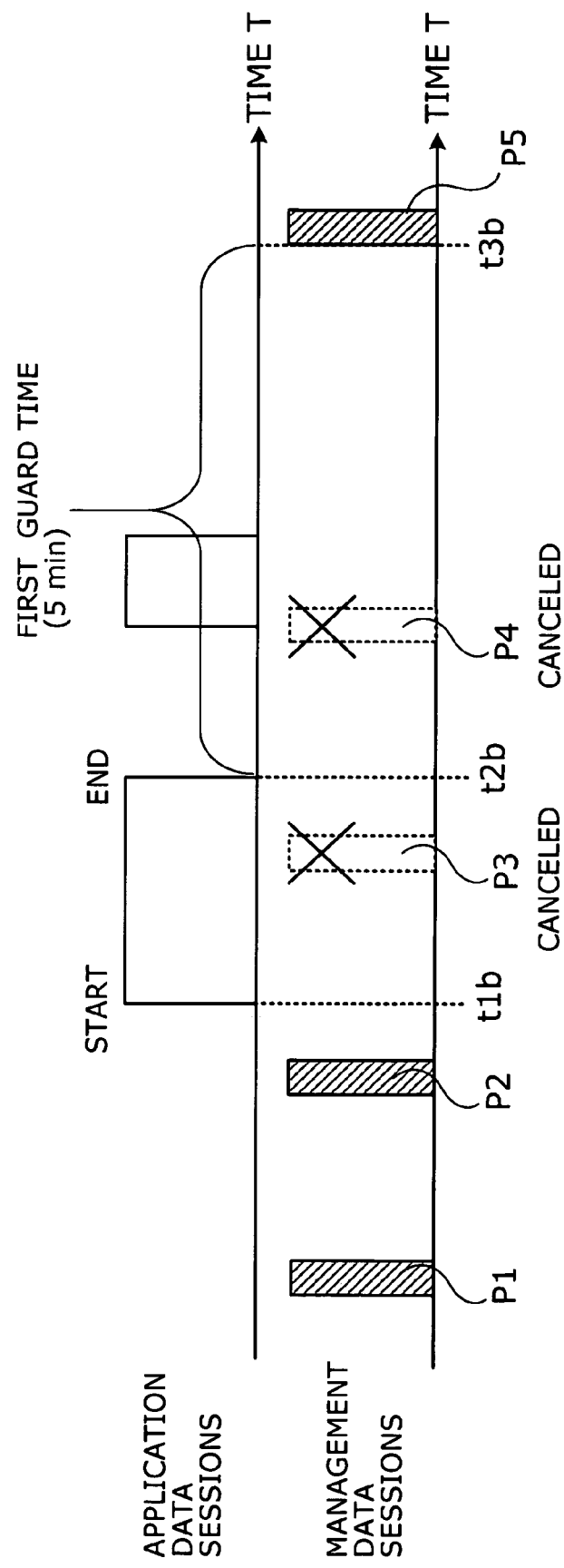
FIG. 17 shows an example of the scheduling process of the second embodiment.

FIG. 17 depicts a scheduling process of the second embodiment by way of example. An application data session starts at time point t1b and lasts until t2b. When this session is finished, the communication scheduler 60a enters the state of waiting for communication permission, which suppresses the periodic polling operations during the first guard time of, for example, five minutes between t2b and t3b. Management data sessions P3 and P4 are canceled accordingly. When time point t3b is reached, the communication estimator 33 issues communication permission to the communication scheduler 60a, which permits the communication scheduler 60a to send a management data communication restart request to the management data communication interface 70. As a result, the suspended periodic polling (or management data session P5) is executed. The restarting of periodic polling may take place immediately upon removal of the suspension, so as to communicate management data promptly. This data communications system of the second embodiment provides the same advantages as the first embodiment.

While the communication scheduler 60 of the first embodiment waits for a specified time before restarting management data sessions, this first embodiment may be slightly modified to include a communication estimator 33 to monitor the traffic of application data. That is, the communication estimator 33 sends communication permission to the communication scheduler 60 immediately upon detection of the end of an application data session, thereby allowing management data sessions to resume. In other words, the first embodiment may be modified such that a pending management data session can surely start upon completion of an ongoing application data session.

Third Embodiment

Figure 18:
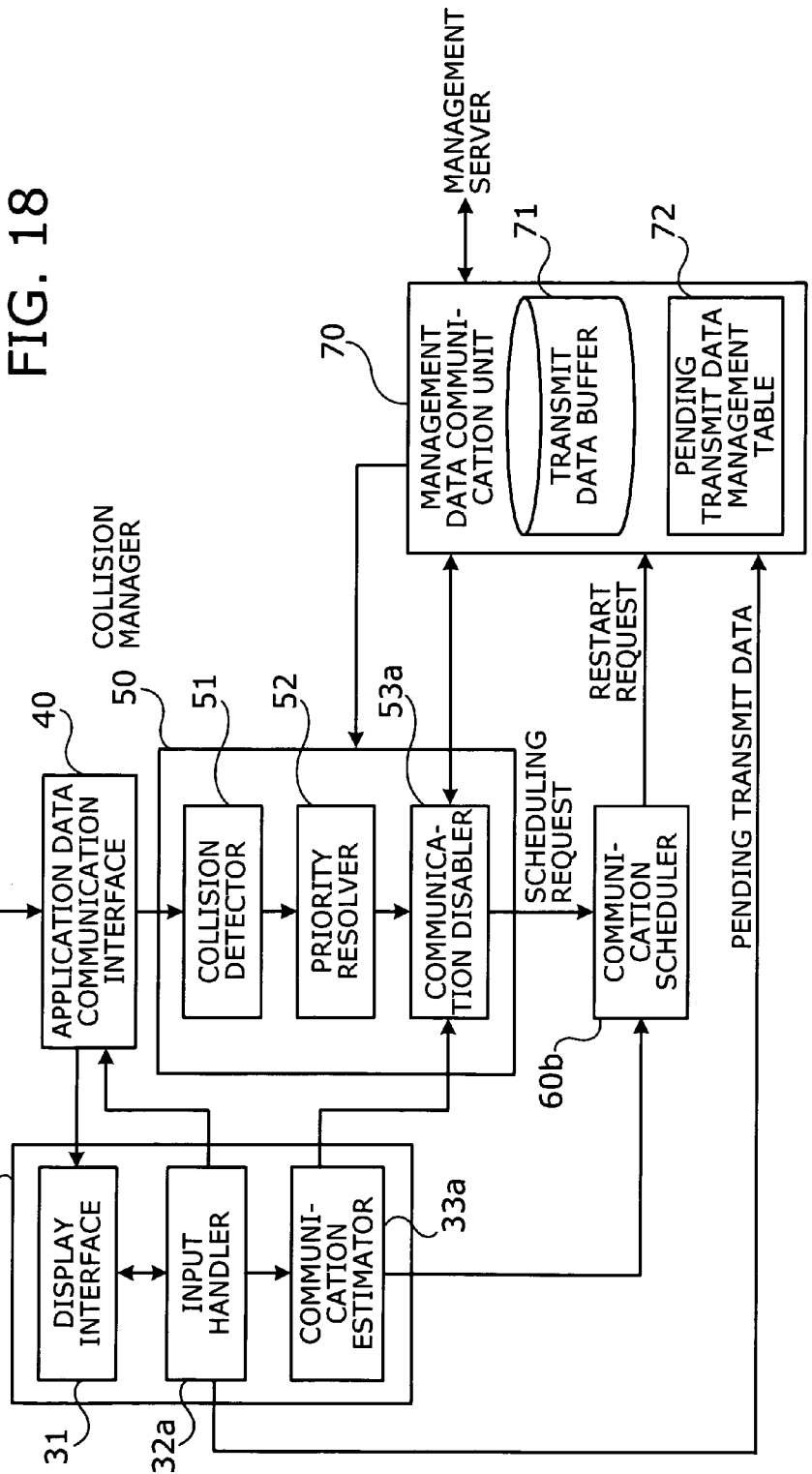
FIG. 18 is a block diagram of a data communications system according to a third embodiment of the present invention.

FIG. 18 is a block diagram of a data communications system according to a third embodiment of the present invention. Since many elements of the third embodiment are common to the first embodiment described earlier, the following description of the third embodiment will focus on its distinct features, without repeating the explanation for the same elements. Specifically, the third embodiment differs from the first embodiment primarily in that the mobile terminal 20b has a communication estimator 33a as a new element of its user interface controller 30b. Another difference of the mobile terminal 20b is that its input handler 32a and communication scheduler 60b are modified.

The third embodiment provides a data communications system that includes an optional operation in application data communication. The user is allowed to select this optional operation by using the input devices 12. When the option is selected, the input handler 32a of the third embodiment is equivalent to the input handler 32 of the first embodiment, as is the communication disabler 53a to the communication disabler 53, and the communication scheduler 60b to the communication scheduler 60. The following will describe how each element functions when the option is selected.

The input handler 32a compiles application data and passes it to the application data communication interface 40. At the same time, the input handler 32a notifies the communication estimator 33a of the creation of application data. Upon receipt of this notice, the communication estimator 33a issues a management data communication stop request to the communication disabler 53a. The communication estimator 33a waits for a specified time (hereafter, "second guard time") before sending communication permission to the communication scheduler 60b. This second guard time is determined previously by, for example, the administrator of the application server 100 and set to the communication estimator 33a. Preferably, but not necessarily, the second guard time is longer than the duration of an application data session, so that the periodic polling will be surely suppressed for a required time after an application data session is finished.

The communication disabler 53a suspends the management data communication interface 70 upon receipt of a management data communication stop request from the communication estimator 33a, thus stopping management data sessions. The communication scheduler 60b in the second embodiment is different from its counterpart in the first embodiment in that it does not allow the management data communication interface 70 to restart its operation immediately even if the specified time has elapsed, but waits for permission from the communication estimator 33a. It is not until permission is received that the communication scheduler 60b issues a management data communication restart request to the management data communication interface 70.

Figure 19:
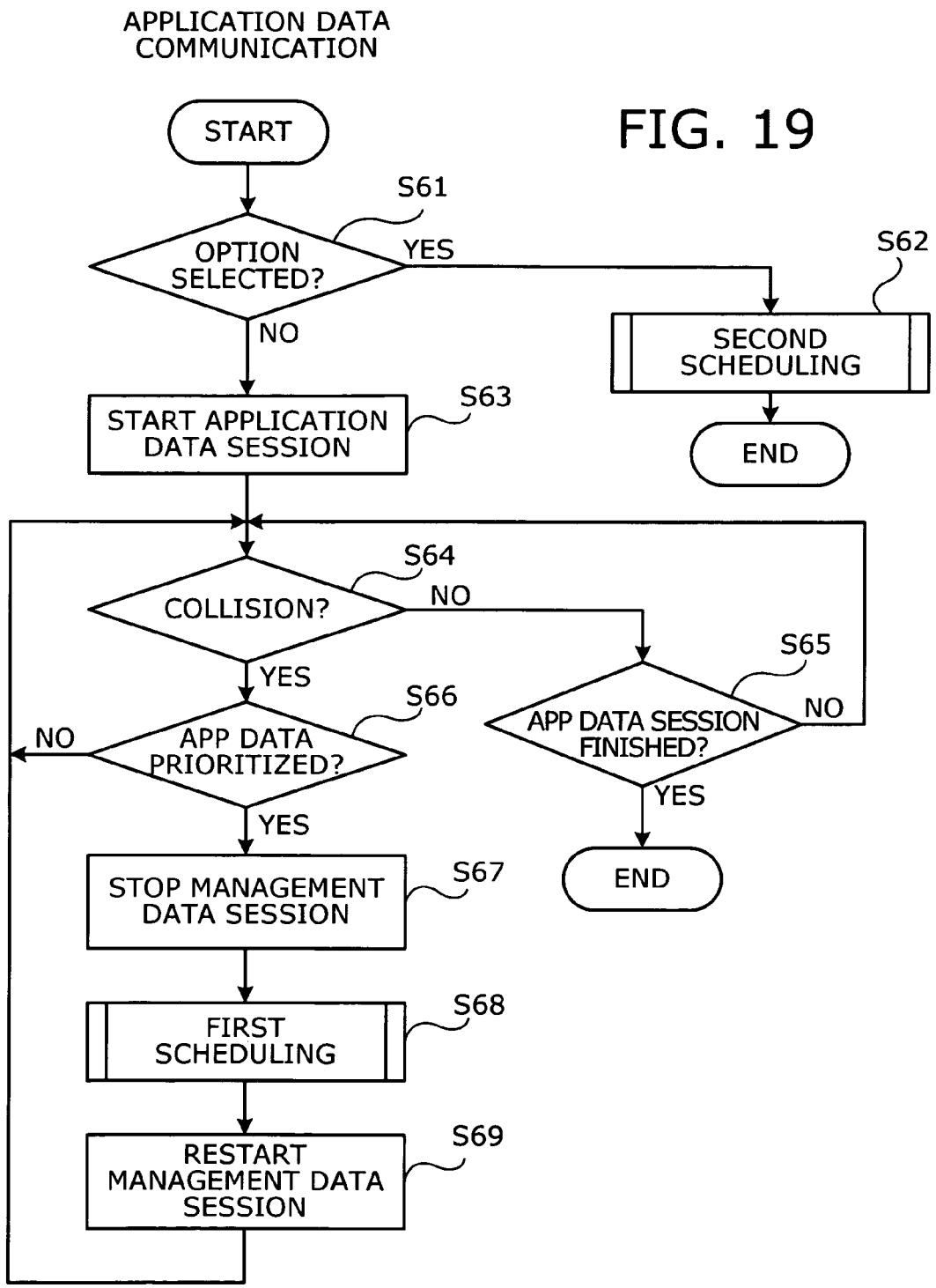
FIG. 19 is a flowchart showing application data communication according to the third embodiment.

FIG. 19 is a flowchart showing how the mobile terminal 20b communicates application data with a server according to the third embodiment of the present invention. The mobile terminal 20b begins with determining whether the option is selected (step S61). If it is selected (if "YES" at step S61), the mobile terminal 20b executes a second scheduling process (step S62), thus closing the communication of application data. If it is not selected (if "NO" at step S61), the process advances to step S63. The subsequent steps S63 to S69 are equivalent to steps S11 to S17 of FIG. 10, respectively.

Figure 20:
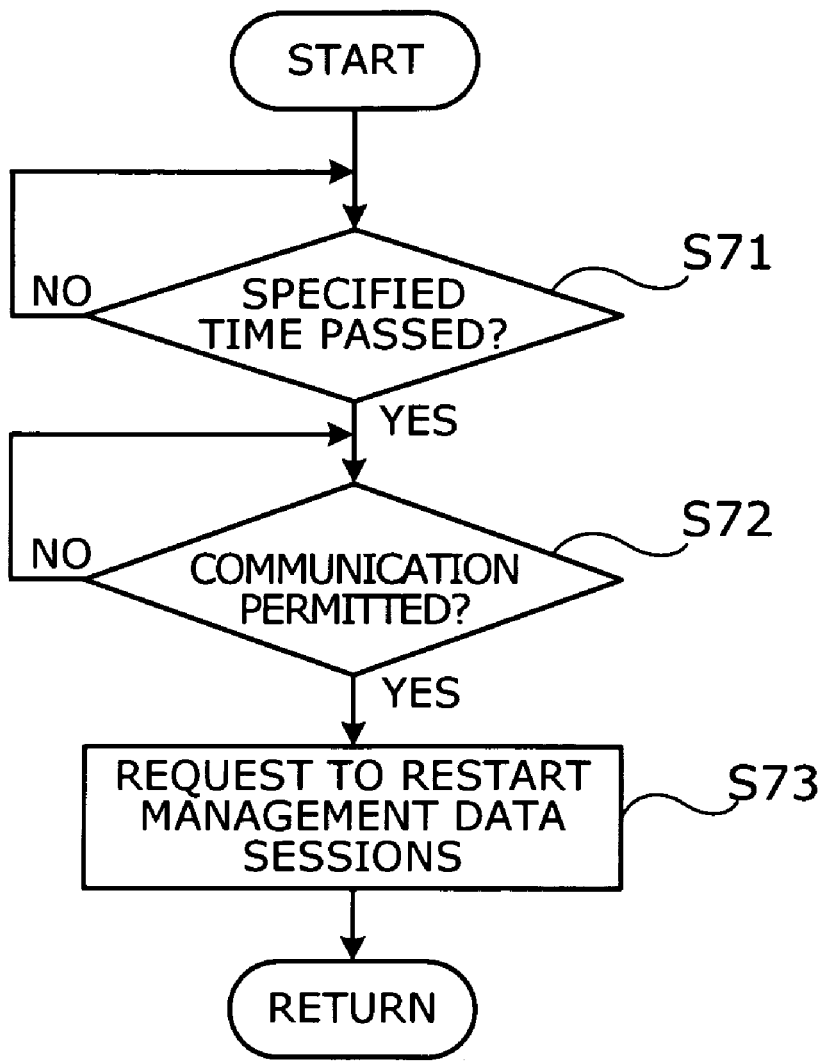
FIG. 20 is a flowchart of a second scheduling process.

Referring to a flowchart of FIG. 20, the second scheduling process at step S62 is shown. This process is actually the same as the foregoing scheduling process of the second embodiment. That is, upon receipt of a scheduling request, the communication scheduler 60b waits for a specified time (step S71) while repetitively checking the elapsed time (if "NO" at step S71). If the specified time has elapsed (if "YES" at step S71), the communication scheduler 60b determines whether communication permission is received from the communication estimator 33a (step S72). If there is no permission received (if "NO" at step S72), the communication scheduler 60a waits for it. When permission is received (if "YES" at step S72), the communication scheduler 60b issues a management data communication restart request to the management data communication interface 70 (step S73), thus concluding the second scheduling process.

Referring to FIG. 21, the scheduling process of the third embodiment will be described below, with focus on its difference from the first embodiment and without repeating explanation for their common part. The scheduling process of FIG. 21 begins with a user input received through the input device 12. Specifically, the user presses a SEND button 314, which initiates an application data session at time point t1c. The communication estimator 33a also starts counting the time for a second guard time, which lasts three minutes, for example, from t1c to t2c. When time point t2c is reached, the communication estimator 33a issues communication permission to the communication scheduler 60b, which allows the communication scheduler 60b to send a management data communication restart request to the management data communication interface 70. The management data sessions then start again at t2c.

Besides providing the same advantages as the first embodiment, the above-described data communications system of the third embodiment ensures that the periodic polling is suppressed substantially during the period between the user's depression of a SEND button 314 and the end of the second guard time. This feature applies to the mobile application page 310 described earlier, where some tags (e.g., SEND button 314, link field 311) are embedded to generate application data. The suppression of management data sessions reduces collisions as much as possible and thus smoothes the traffic flow of application data.

The above-described third embodiment is designed to raise a management data communication stop request when the input handler 32a has produced application data to be sent. The present invention, however, should not be limited to that implementation. An alternative way is to raise a management data communication stop request in direct response to the user's operation of the input device 12. More specifically, suppose that the user has entered something with the input device 12 when a mobile application page 310 appears on the monitor 11. Whatever this user input may be, the input handler 32a responsively commands the communication estimator 33a to send a management data communication stop request to the communication disabler 53a. That is, the communication estimator 33a proactively suppresses management data sessions in expectation of the user's pressing of the SEND button 314 and consequent production of application data.

The features of the foregoing three embodiments may be implemented individually or in combination. For example, the scheduling process of the second embodiment may be combined with that of the third embodiment. In this case, the communication estimator 33a chooses a sum of the application data session length and first guard time, or the second guard time, whichever is longer. The communication estimator 33a sends communication permission to the communication scheduler 60b after the selected time elapses.

Every data communications system described in the specification assumes a single mobile terminal 20 connected to the application server 100 and management server 200. This simplification is, of course, only for illustrative purposes. The actual systems can serve a plurality of mobile terminals.

Computer-Readable Storage Medium

The above-described processing functions are implemented as a computer application. That is, the present invention can be realized by running a data communication program encoded with a series of instructions describing what the mobile terminal is supposed to do. A computer system executes that program to provide the intended functions of the present invention. For the purpose of storage and distribution, the program may be stored in a computer-readable storage medium. Specifically, the suitable storage media include: magnetic storage media, optical discs, magneto-optical storage media, and solid state memory devices. Magnetic storage media include hard disk drives (HDD), flexible disks (FD), and magnetic tapes. Optical discs include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for circulation of computer programs. Network-based distribution of software programs is also possible, in which case several master program files are made available on a server computer for downloading to other computers via a network. A user computer stores necessary software components in its local storage unit, which have previously been installed from a portable storage media or downloaded from a server computer. The computer executes the programs read out of the local storage unit, thereby performing the programmed functions. As an alternative way of program execution, the computer may execute programs, reading out program codes directly from a portable storage medium. Another alternative method is that the user computer dynamically downloads programs from a server computer when they are demanded and executes them upon delivery.

CONCLUSION

To summarize the above discussions, the present invention provides a mobile terminal that sends and receives both application data and management data to from corresponding servers. When a collision between application data and management data is detected, the priority of those data is determined. In the case where the application is higher in priority, the management data sessions are suspended. This feature of the present invention maintains the performance of application data communication.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A non-transitory computer-readable medium storing a program for use in a mobile terminal containing a computer to communicate data with servers, the program causing the computer to perform:
    a management data communication instruction that communicates management data regularly with a management server;
    an application data communication instruction that communicates application data with an application server on a demand basis;
    a data collision detecting instruction that detects a collision between the management data and the application data;
    a priority resolution instruction that determines whether to prioritize the application data over the management data, when a collision therebetween has been detected when performing the data collision detecting instruction;
    a management data suppressing instruction that suspends the management data communication instruction when the priority resolution instruction has determined that the application data should be prioritized over the management data;
    a storage instruction to store pending management data to be transmitted to the management server; and
    a tag detecting instruction that detects whether or not a mobile application page has some tags for generating application data,
    wherein the priority resolution instruction prioritizes the application data when the amount of the pending management data is equal to or smaller than a predetermined threshold or the number of messages carrying the pending management data is equal to or smaller than a predetermined threshold,
    whereas the priority resolution instruction prioritizes the management data when the mobile terminal sends the management server a command related to communication control, and
    wherein the management data communication instruction reduces an interval of communication sessions of the management data when the priority resolution instruction prioritizes the management data, and
    wherein the mobile terminal suppresses the communication sessions when the mobile application page has some tags for generating application data.

2. The non-transitory computer-readable medium according to claim 1, further comprising a storage instruction to store pending management data to be transmitted to the management server,
    wherein the priority resolution instruction prioritizes the application data when the time that the pending management data stays in storage is shorter than a predetermined threshold.

3. The non-transitory computer-readable medium according to claim 1, wherein the management data suppressing instruction suspends the management data communication instruction until a predetermined period passes after completion of a communication session of the application data.

4. The non-transitory computer-readable medium according to claim 1, further comprising an input processing instruction that starts a communication session for the application data upon receipt of a user input requesting transmission of the application data,
    wherein the management data suppressing instruction suspends the management data communication instruction upon receipt of the user input, and continues suspending for a predetermined period longer than a duration of the communication session of the application data.

5. The non-transitory computer-readable medium according to claim 1, wherein the management data suppressing instruction transmits the management data in a case where the management data suppressing instruction suspends the communication of the management data.

6. The non-transitory computer-readable medium according to claim 1, further comprising an input processing instruction that starts a communication session for the application data when detecting user start of generation of the application data with an input device connected to the computer,
    wherein the management data suppressing instruction suspends the management data communication instruction upon receipt of the command, and continues suspending for a predetermined period.

7. The non-transitory computer-readable medium according to claim 1, wherein the mobile terminal monitors the condition of radio wave signals, and the management data suppressing instruction restricts the communication sessions for a predetermined period of time if a signal level is low.

8. A method for use in a mobile terminal containing a computer to communicate data with servers, the method comprising:
    communicating management data regularly with a management server;
    communicating application data with an application server on a demand basis;
    detecting a collision between the management data and application data being communicated;
    determining whether to prioritize the application data over the management data, when a collision is detected between the application data and management data;
    suspending a communication session of the management data when said determining step has determined that the application data should be prioritized over the management data; and
    detecting whether or not a mobile application page has some tags for generating application data,
    wherein the application data is prioritized when the amount of pending management data to be transmitted to the management server is equal to or smaller than a predetermined threshold or the number of messages carrying the pending management data is equal to or smaller than a predetermined threshold, the pending management data being stored in a storage unit,
    the management data is prioritized when a command related to communication control is sent to the management server, and an interval of communication sessions of the management data is reduced when the management data is prioritized, wherein the mobile terminal suppresses the communication sessions when the mobile application page has some tags for generating application data.

9. A mobile terminal containing a computer to communicate data with servers, comprising:

a management data communication unit to communicate management data regularly with a management server;

an application data communication unit to communicate application data with an application server on a demand basis;

a data collision detecting unit to detect a collision between the management data and the application data;

a priority resolution unit to determine whether to prioritize the application data over the management data, when the data collision detecting unit has detected a collision therebetween;

a management data suppressing unit to suspend the management data communication unit when the priority resolution unit has determined that the application data should be prioritized over the management data;

a storage unit to store pending management data to be transmitted to the management server; and a tag detecting unit to detect whether or not a mobile application page has some tags for generating application data, wherein the priority resolution unit prioritizes the application data when the amount of the pending management data is equal to or smaller than a predetermined threshold or the number of messages carrying the pending management data is equal to or smaller than a predetermined threshold, the priority resolution unit prioritizes the management data when the mobile terminal sends the management server a command related to communication control, and the management data communication unit reduces an interval of communication sessions of the management data when the priority resolution unit prioritizes the management data, wherein the mobile terminal suppresses the communication sessions when the mobile application page has some tags for generating application data.

* * * * *